United States Patent [19]

Frissora

[11] 4,180,209
[45] Dec. 25, 1979

[54] SOLAR ENERGY OPERATED SYSTEM AND METHOD

[75] Inventor: Joseph R. Frissora, Corning, N.Y.

[73] Assignee: Owens-Illinois, Inc., Toledo, Ohio

[21] Appl. No.: 837,495

[22] Filed: Sep. 28, 1977

[51] Int. Cl.² ............................................. F24J 3/02
[52] U.S. Cl. .................................... 237/1 A; 126/430
[58] Field of Search ............... 237/1 A; 62/2; 60/641; 126/271, 400; 165/4, 18, 106; 137/571

[56] References Cited

U.S. PATENT DOCUMENTS

| | | | |
|---|---|---|---|
| 1,853,480 | 4/1932 | Wheeler | 237/1 A |
| 2,486,833 | 11/1949 | Freund | 62/2 |
| 3,935,897 | 2/1976 | Pulver | 237/1 A |
| 4,007,776 | 2/1977 | Alkasab | 237/1 A |
| 4,012,920 | 3/1977 | Kirshbaum | 62/2 |

OTHER PUBLICATIONS

*Proceedings of the Workshop on Solar Heating and Cooling of Buildings,* Wash. D.C., Jun. 17-19, 1974, Prep. by Dept. Mech. & Chem. Eng., U. of Va & Ashrae, pp. 13 and 59.

*Primary Examiner*—Carroll B. Dority, Jr.
*Assistant Examiner*—Lee E. Barrett
*Attorney, Agent, or Firm*—John R. Nelson; Myron E. Click; David H. Wilson

[57] ABSTRACT

There is disclosed a solar energy operated system and method in which a quantity of liquid media is placed in solar collectors and heated to a preselected temperature therein. Upon reaching this temperature, the liquid is transferred to a first storage vessel. The liquid is replaced in the collectors from a separate second storage vessel. The hot liquid is drawn from the first vessel and circulated to a heat exchanger of a heat operated device, such as an absorption refrigeration device or a space heating device, and heat is exchanged thereby to operate such device. The liquid is returned from the heat exchanger of the device to the second storage vessel so as not to thermally contaminate the higher temperature liquid processed by the solar collectors. This is termed a batching method of operating the solar energy collectors in the system. The system maintains a supply of useful high quality thermal energy in the liquid media at a constant selected temperature to meet operating conditions of the heat operated device in which it is to be used. Also the system provides for auxiliary heating of the liquid to supplement solar energy when the latter is not readily available or insufficient to meet the demand of the load. Domestic hot water is obtained by circulation of water through heat exchange means in the second vessel. The functions of the system are maintained by an electronic programmable controller to carry out the transfer of liquid in the system according to selected data and conditions.

20 Claims, 3 Drawing Figures

SOLAR ENERGY OPERATED SYSTEM AND METHOD

The invention relates to operating heat powered devices by solar radiant energy obtained by a collector exposed to solar radiation and absorbed thereby as heat exchanged with a liquid media in the collector, and more particularly to a system and method of handling the energy laden liquid media in operating one or more thermal energy utilization devices.

BACKGROUND OF THE INVENTION

Several processes and devices used in connection therewith require a prescribed constant temperature of thermal energy of the heat exchange media used to operate same if it is to perform within a coefficient of performance (C.O.P.) or top efficiency of operation to which it is designed. Examples of such are absorption refrigeration machines, space heating systems, Rankin cycle engines, Sterling cycle engines, sterilization processes, pasturizing processes, and food processing, to name a few. It is desirable to utilize solar radiant energy as a source of the thermal energy for operating such devices and processes.

To date, solar energy systems employ a working media—usually liquid—which is pumped through the solar energy collector apparatus and therein the working media is heated by the exchange of absorbed solar energy within the collector. The liquid after receiving the thermal energy in the solar collector apparatus is placed in a storage tank for use by the demand of the process or device in the system. The liquid media is withdrawn usually from the hotter top strata of the tank and circulated through the heat operated device wherein heat is exchanged from the circulated media to run the device, and then the media at lower temperature is returned to the lower cooler strata of the storage tank. Liquid from the lower strata therein is transferred again to the collectors for raising its temperature and the cycle is repeated. The storage tank is utilized in such manner under what is known as stratified storage of the liquid. Stratified storage tanks are subject to some circulation within them by convection and by the liquid movement into and out of the tank. See for example U.S. Pat. No. 4,034,912 utilizing a stratified storage tank and control for putting the stored energy in the system switched between solar heating apparatus and conventional heating apparatus to meet the system thermal requirements. Some of the prior systems using stratified tanks have incorporated structural baffles to separate the hotter and colder liquid strata therein. Examples of this are set forth in U.S. Pat. Nos. 3,996,759; 4,027,821; and 4,037,785.

Moreover, the movement of the liquid working media into and through the solar energy collector apparatus is presently regulated on a control cycle as a function of plural variables, namely, quantity, time, and flow rate. However, the solar energy collector is subject to variable output because of weather factors, such as cloud cover or haze, and angular incidents and quantity of the radiation on the collector will vary during the day and seasonally. This presents a serious control problem for maintaining a desired constant temperature media available for the heat utilization device or process.

SUMMARY OF THE INVENTION

The present invention has as its primary objective a solar energy operated system and process for maintaining liquid media at a constant temperature level and utilizing same therein in operating the heat utilization device, or devices, of the system at their high efficiency or rated coefficient of performance.

A more specific aspect of the invention is to provide a unique solution to the aforementioned problems by using separate storage tanks for liquid media in the system. The solar energy heated liquid is stored in a high temperature tank at a desired operating temperature of the device or process in which it is to be utilized, and is transferred there from the solar collector apparatus only when at that temperature. Thus, the principle control point is a preselected temperature of the liquid in the collector without regard for time, flow rate, or the like. Contamination of the operating liquid at constant useful temperature or energy level is avoided by separating the lower temperature liquid therefrom in the system. To do this the lower temperature liquid resulting after use in the operation of the heat utilizing device is transferred to a separate storage tank and liquid is transferred into the solar collectors from this separate second storage tank; thereby maintaining an inventory of the useful high temperature media for most efficient operation of the heat operated machine.

Another object of the invention is to employ a batching method of the liquid in the operation of the collectors which involves running the pump to fill the collectors with liquid from the closed system and stopping pump action until the liquid in the collectors has achieved a desired high quality energy level, which is a function of liquid temperature, whereupon this liquid "batch" at that temperature is pumped to the high temperature storage tank while it is replaced in the collectors with lower temperature liquid from a separate source—the second separate storage tank of the system. This accumulates energy in the liquid batch that is desirable and useful without regard for further control in dealing with the liquid or solar flux variables.

A further object of the invention is to provide a solar energy operated system in which tank size and flow loop size for working fluids may be kept to a minimum thereby minimizing heat loss from large hot fluid storage, energy consumption and pump cost, compared to prior systems in which pumping and flow is constant and need be closely controlled.

A further object of the invention is to provide a solar energy operated system which may be managed to provide the energy load requirements on a most cost effective basis by the variation, as needed, in the amount of solar energy collector area utilized by the system at a given time; and further for the inclusion of supplemental conventional energy sources in the system to meet the load requirements with a practical investment in the apparatus and most efficient utilization of the energy supplement from available conventional energy sources (utilities) on a programmed basis.

A still further object of the invention is a solar energy operated system and method furnishing cooling or refrigeration utilizing an absorption refrigeration machine functioning at or near its optimum C.O.P. by supplying such machine with constant temperature high energy liquid in its temperature range that produces highly efficient operation of the absorption refrigeration machine.

And, a still further aspect of the invention is to provide for making domestic hot water in the system utilizing residual thermal energy exchange to the domestic water from the liquid media stored in the separate second storage tank of the two tank system, as described herein.

BRIEF DESCRIPTION OF THE DRAWINGS

Further characteristics and advantages of the present invention will become more apparent from the detailed description given hereinafter with reference to the accompanying drawings, supplied by way of a nonlimiting preferred example, on which.

DESCRIPTION OF THE PREFERRED EMBODIMENTS

Figures 1, 1A:
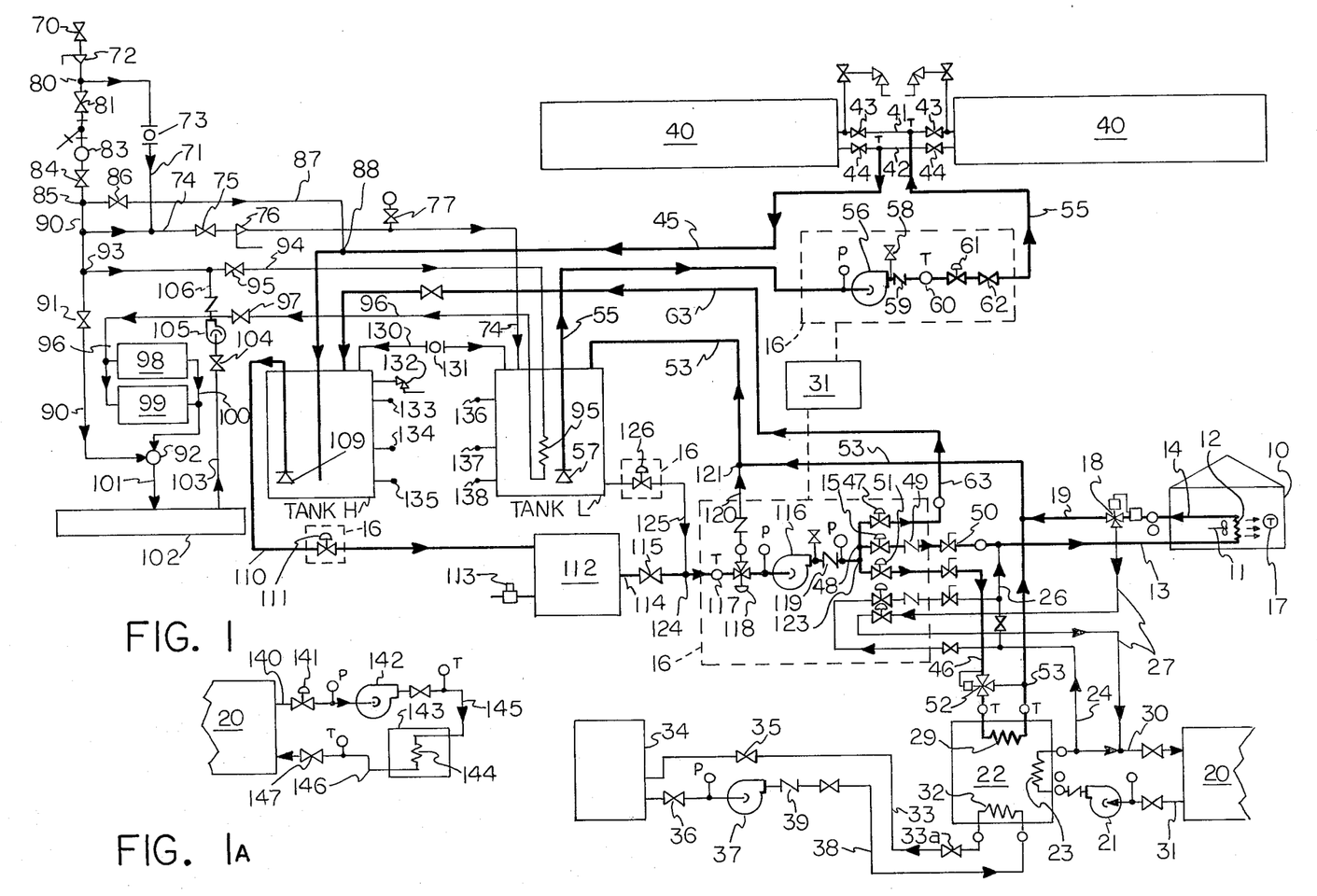
FIG. 1 is a diagrammatic view of a system in accordance with the principles of the present invention.
FIG. 1A is a segmented diagrammatic view of a portion of FIG. 1 showing a supplemental cooling subsystem coupled with the system of FIG. 1.

A preferred embodiment of the invention is shown on the schematic diagram of FIG. 1 in which a heat operated apparatus is shown in the form of a heating/cooling device for a space within a building 10. The device is shown schematically as a forced air apparatus 11 operating within the building through a heat exchanger 12. For heating purposes, the heat exchanger 12 receives heated liquid media through the circuit comprised of conduit 13 to the heat exchanger and conduit 14 from the heat exchanger, the conduit 13 receiving high temperature liquid through the electrically operated control valve 15 that is within the control console 16 (enclosed by dotted lines on FIG. 1) which is connected with and operated by demand for heat from a thermostat 17 within building 10. The thermostat 17 is connected into controller 31 (hereinafter described) which controls the operation of valve 15. Liquid returning in conduit 14 is under the control of the thermostatic diverting valve 18 which sets the circuit in the heating mode to connect the return of the used liquid with conduit 19.

In the alternative, cooling of building 10 is accomplished by circulating chilled liquid from the storage tank 20, which is an insulated vessel, through chiller pump 21 and through the cooling coil 23 of an absorption refrigeration machine 22 and into conduit 24. The conduit 24 includes the electrically operated valve 25, when closed routes the flow of liquid in conduit 26, the latter being connected with the conduit 13 to heat exchanger 12 in the forced air apparatus 11. A gate valve is in conduit line 26 between conduits 24 and 13. Liquid from heat exchanger 12 is returned to tank 20 by setting the diverting valve 18 to connect the return line 14 with conduit 27. An electrically operated valve 28 is in the return line 27. Valve 28 is within the control console 16 and is set in open position by the controller for return of the chilled liquid. The absorption refrigeration machine 22 is schematically illustrated and may be, for example, an absorption unit of the type sold by Arkla Corporation of Evansville, Ind., typically one having a 25 ton air conditioning capacity. Such a machine utilizes three heat exchange loops and is operated by high temperature liquid (usually water) at about 240° F. introduced into the machine at its generator which is represented by the heat exchanger 29. The heat exchanged at generator 29 causes the absorption medium (e.g. lithium bromide solution) to boil. The machine produces cooling for the chilling of the liquid (water or brine) at the heat exchanger 23 thereof and this supplies chilled liquid to either the conduit 24 in the cooling circuit to building 10, or it places chilled liquid in conduit 30 connected into the tank 20 when so controlled by the valves 25 and 28 being in their closed position. The heat that is absorbed in heat exchange at coil 32 by a solution therein (water) which is pumped in the third circuit of the machine 22 through conduit 33 into the top of a cooling tower (e.g. a Frick model CCC 160 closed circuit cooler) 34. The conduit 33 includes a balancing valve 33a and gate valve 35. The cooled condenser water is circulated from the bottom of cooling tower 34 into the suction side of pump 37. The discharge of the pump enters conduit 38 connected to coil 32. Conduit 38 includes check valve 39 and a gate valve. This choice of function of either storing or circulating liquid from the refrigeration machine is determined by the electronic programmable controller 31 of the control console 16, to be hereinafter described, in opening or closing the circuit of conduits 24, 26, and 27 regulated by the two electrically operated valves 25 and 28. The demand in building 10 to be satisfied for either heating or cooling is set by the thermostat 17 and the logic or program established within the electronic programmable controller 31. The controller 31 which is preferred is a commercially available unit sold by Andover Controls, Inc. of Andover, Mass. as its SK-1 Programmable Controller. This controller unit, the SK-1, has ample logic capability to perform the control functions herein described. The foregoing establishes an example of a heat operated device that is a circuit in the system with a high temperature liquid circulated by this invention.

Solar Energy Heated Liquid Circuit

The primary energy for operating the machine or load of the system is obtained through an array of solar energy collectors 40 which are mounted in a suitable solar exposure. The collectors 40 each include an inlet connected together through conduit means 41 and their outlets are connected together through conduit means 42. The conduit 41 includes gate valves 43 to each collector array regulating flow to each collector. Similarly conduit 42 includes gate valves 44 individual to each of the collectors regulating flow from each of the collectors.

The collectors 40 may be any type of solar energy converter which absorbs energy of solar radiation and transfers that energy as heat to a media that is introduced to the collectors, heated thereby and removed from the collectors. An example of the solar energy collectors preferred for use in the present invention is the high efficiency type, such as the tubular evacuated glass collector. This type solar energy collector apparatus is exemplified and is structurally described in U.S. Pat. Nos. 4,033,327 and 4,043,318, which are incorporated herein by reference.

The outlet conduit 42 of collectors 40 is connected in the fluid circuit with a first conduit 45 extending into a first fluid storage means in the form of high temperature storage tank H. Tank H is insulated to retain the high temperature liquid as it is transferred from collectors 40 therein, and is in the present example a steel pressure vessel with volume capacity of about 3,000 gallons. The liquid temperature is sensed in the outlet of the collectors (T at junction of conduits 42 and 45) and as the temperature of the liquid in the collectors reaches a high temperature for operating the apparatus, viz, at or above 240° F., the high temperature liquid is transferred to tank H in the manner to be described. This high temperature level is determined as the temperature level at which the heat operated device will operate efficiently. An absorption air conditioning machine, the example herein given, has a typical requirement for high temperature liquid in the range of 190°–220° F., and some closed-cycle freon systems may operate using 250° F. liquid. If the device is a steam engine it can be operated at about 300° F. Conceivably, the liquid could be placed in tank H up to about 600° F. using the higher efficiency collectors mentioned herein. The selected higher operating temperature selected is therefore a function of the particular type of heat engine being operated, i.e. Rankin cycle, Sterling cycle, absorption cycle, etc. There is a second conduit 110 extending from the tank H to the heat operated machine, such as the heat exchanger 29 of the absorption refrigeration machine or the heat exchanger 12 of the heating unit. Conduit 110 includes a foot valve at its end in tank H and extends through electrically operated valve 111 in the control console 16. This part of the liquid circuit extends through the gas fired boiler 112 (to be described hereinafter) and exits therefrom as conduit 114 including the gate valve 115, temperature sensor 117, electric (electrically operated) tempering valve 118, connected to the suction side of pump 116. The hot water heating pump 116 is, by way of example, a 60 GPM pump operated under the control of controller 31 and is situated in the control console 16. The discharge side of pump 116 has an air vent and check valve 119 and is T-connected at 123 with the conduits 13 and 46. The three electrically operated valves 47, 15 and 51 collectively control the flow of pumped liquid from this junction point 123. The temperature sensors used herein, indicated by the symbol T on FIG. 1, are thermistors which produce an analog (electronic) signal to controller 31 for processing and regulation of the elements controlled thereby in the system. Conduit 110 includes electrically operated valve 47 in the console 16 controlling flow of high temperature liquid in its circuit in conduit 63 back to tank H. The conduit 46 is connected to the junction 123 in the console and extends to the heat exchanger 29. The conduit 13 is T-connected at the junction point 48 and flow through it is regulated by the electrically operated valve 15 in the console. The conduit 13 also includes a check valve 49 permitting flow to the heat exchanger 12 when valve 15 is opened and a balancing valve 50. With valves 15 and 47 each closed, high temperature liquid is transferred through the electrically operated valve 51 to the heat exchanger 29; however, the heat exchanger 29 may be bypassed in the connection of the thermostatic diverting valve 52 which is crossed to the return conduit 53 extending from heat exchanger 29 to the low tank L. There is a balancing valve 54 in conduit 46 between controlled valve 51 and the diverting valve 52. There are temperature sensors (T) on either side of the heat exchanger 29 to provide the temperature data to the controller 31. The liquid is returned from heat exchanger 29 in the third conduit 53 of the circuit which extends into the tank L. This tank L is preferably insulated and may be a steel pressure vessel of about 3,000 gallons capacity. It receives only liquid in the circuit which is below operating temperature; i.e., the low temperature liquid.

Liquid is supplied to the inlet conduit 41 of collectors 40 from tank L through the fourth conduit 55 and includes solar pump 56, which may be about a 45 GPM capacity pump. The suction side of pump 56 receives liquid only from tank L drawn through foot valve 57 on conduit 55. The discharge side of pump 56 goes to the collectors 40. Pump 56 is within the control console 16 and the output side of the pump includes an air vent gate valve 58, a check valve 59, temperature sensor 60 and electrically operated control valve 61. Also conduit 55 includes a gate valve 62 normally open. Control valve 61 is opened by response from controller 31 which operates it and the solar pump 56 is also operated by the controller 31. Low temperature liquid is thereby transferred in conduit 55 into the inlet conduit 41 of the collectors. The heated liquid at high temperature in the collectors is displaced and transferred through outlet conduit 42 and the conduit 45 of the circuit into tank H. Output temperature of liquid from the collectors is monitored by controller 31 at the outlet duct (point T) and so long as useful liquid in the higher temperature operating range is present, the controller 31 has the pump 56 and valve 61 maintain flow of lower temperature liquid from tank L in the conduit 55 into the collector inlet thereby draining the collector of some or all of the useful higher temperature liquid. This useful higher temperature liquid is always transferred into tank H through line 45.

Auxiliary Circuits

As is often the case there are periods when solar radiation may not be sufficient because of cloud cover to supply the total energy levels that may be effectively and economically absorbed by the collector needed for heating and maintaining the liquid at operating temperature. For such periods, a conventional energy supply system is provided as a supplemental source of energy. In periods when solar origin heat from the collectors 40 is not available or is insufficient, liquid is withdrawn from tank H at a foot valve 109 on the end of conduit 110 therein. Conduit 110 is connected to a fossil fuel fired boiler 112, such as a conventional gas or oil fired boiler, the fuel being supplied at the fuel control 113. Flow of liquid in conduit 110 is under control of the electrically operated flow control valve 111 which is included within cabinet console 16. The liquid is heated by boiler 112 when in operation and connected to the suction side of a hot water heating pump 116 by a conduit 114 which includes in series with it a gate valve 115, temperature sensor 117, and electrically operated valve 118. The discharge of pump 116 is connected through a one way check valve 119 into the T connection at 123 with conduit 46. The pump 116 should have a capacity on the order of 60 gallons per minute. The tank L is also T-connected at 124 through conduit 125 to the conduit 114 and the suction side of pump 116, the flow from tank L through conduit 125 being under the control of electrically operated control valve 126 which is included in the control console 16. The controller 31 may be programmed for circulating liquid that is heated in the boiler 112 through pump 116 and directly into conduit 46 when the electric valve 51 is opened and the electric valves 15 and 47 are closed. In this mode, the liquid from tank H has heat added to it, if needed, by the boiler 112. The liquid circulated thereby will energize the generator heat exchanger 29 with useful high temperature liquid. The condition is sensed by the temperature sensor 117 for control of these valves such that liquid at the useful high temperature is supplied. Alternatively, if the need is for heating the building at heat exchanger 12, controller 31 sensing a need for that mode of operation sets the electric valve 15 open and closes valves 47 and 51. After circulation through the heat exchanger 12 the liquid reduced in temperature by giving up some of its energy to the building will circulate by to tank L through conduits 14, 19 and 53.

A further alternative is provided should the liquid be below its high temperature operating value. This is accomplished by setting valve 118 for flow at conduits 120 and 53 to tank L; if the temperature of liquid sensed at 117 is below the desired operating level. On the other hand if temperature sensed at 117 is up to the operating temperature level, the liquid may flow through pump 116 and with electric valves 15 and 51 closed and valve 47 opened the pump through conduit 63 to tank H for storage and subsequent use.

As the supply of liquid from tank H may be low or become nearly exhausted, electrically operated valve 126 may be opened to add liquid from tank L into the circuit which is circulated back to and through tank H via valve 118 through pump 116, valve 47 and conduit 63 to be added to tank H and circulated to boiler 112 by conduit 10.

Another auxiliary circuit is shown on FIG. 1A and may be employed in conjunction with the storage vessel 24 for supplementing the chilled liquid supply. Should it be more economical at times to buy energy as electrical energy in the event high temperature is not readily available in the main liquid circuit otherwise requiring use of the auxiliary fossil fuel fired boiler 112 to obtain same in operating the absorption unit 22, a conventional compressor type refrigeration system may be coupled to the chilled liquid storage tank 20 as a supplement to the solar energy operated machine 22. The liquid is removed from upper warmer strata of storage vessel 20 by the connection to line 140 extending into the suction side of pump 142 and regulated by the electrically operated control valve 141. This valve is under control of controller 31 and the program thereof may include local power rate data and most favorable time-of-day metering of the local electrical utility service. The controller 31 will institute the auxiliary cooling of liquid on the basis of best rate basis for purchasing the electrical energy. The discharge of pump 142 is connected to the cooling coils 144 of an (electric) power driven compressor type refrigeration machine 143 by the liquid conduit 145 which includes a check valve and temperature sensor. The pump 142 and compressor unit of this auxiliary refrigeration machine is driven under regulation of the controller 31 of the console. The chilled liquid is returned into the lower strata of storage vessel 20 by way of conduit 146 which includes a temperature sensor and heat valve 147. The temperature differential (drop) of the liquid circulated through this refrigeration machine is monitored on opposite sides of the circuit by the temperature sensors, as shown, and this information is returned to the logic of the programmed controller 31 to determine duration and most economical purchase of this energy, such as electric power to sustain the auxiliary operation. Generally power costs for chilling liquid for the cooling needs of the building will be advantageous in use of the auxiliary cooling unit during some times of the day or night due to advantageous power rates in comparison with the operation of an absorption refrigeration machine by heating the operating liquid to the higher temperature through the supplemental fossil fuel fired boiler unit. This system provides a most economical mode of operation as may be determined by variation of season or variations of the heating day when solar radiant energy for a given installation is not readily available or sufficient to sustain by itself the higher operating temperature needed in the system. Further, by reason of differences in efficiencies and coefficients of performance (C.O.P.) of the two types of refrigeration machines for the respective fuel cost factors may dictate which type of machine should best provide the cooling service in the building 10 on a most cost effective basis.

Domestic Hot Water

A further need in the building may include a supply of domestic hot water in the temperature range 140°–170° F. A supply of water from the city main to the line 70 supplies the hot water system in the invention. At T-connection 93, the line 94 transmits relatively cooler water into tank L containing lowered temperature liquid from the solar energy circuit. Tank L may typically contain liquid in the temperature of 170°–190° F. Water is conveyed through a heat exchange coil 95 in tank L that is interposed between the line 94 and line 96, the latter extending to and through the two parallel connected auxiliary gas fired hot water heaters 98 and 99. A gate valve 97 is installed in line 96 for control. The auxiliary hot water heaters 98 and 99 each may be on the order of 100 gallon units. The hot water heaters 98 and 99 are energized at times when solar residual energy in tank L is insufficient to satisfy domestic hot water requirements. Othewise, the line circuit 96 passes through the hot water heaters without their adding supplemental energy to the water. The output of heated water at the heaters 98, 99 is transmitted through line 100 to a Watts tempering valve 92 and through the conduit 101 into the domestic hot water circulation and distribution service, represented by the block 102. Water is returned from the service 102 for recirculation by line 103 that is connected to the suction side of water pump 105. The line 103 includes gate valve 104. The discharge side of pump 105 is connected to water line 106 through a check valve therein and T-connected to the water line 94 completing the circuit for flow of the water back through the heat exchange coil 95 in tank L.

The tanks H and L are connected to each other through a conduit 130 provided with a globe valve 131 therein for selectively equalizing the pressure in the two tanks, as needed.

Tank H also includes a pressure release valve 132 set for a predetermined operating pressure in the high temperature side of the system. Upper, intermediate and lower level temperature sensors 133, 134, and 135, respectively, are provided in the tank H for monitoring temperature and level of liquid within this tank. Similarly tank L includes upper, intermediate and lower level sensors 136, 137, and 138, respectively, for monitoring temperature and liquid level in this tank.

Liquid Media Supply

The necessary quantity of liquid is supplied into the circuit of the system from a convenient supply, such as a municipal water main indicated at gate valve 70 connected with the supply line 71. A Watts back flow preventer valve 72 is installed in line 71 along with the globe valve 73 for regulating flow. Water line 71 is T-connected with the line 74, as line 74 is also connected to line 90. Water line 90 is connected to line 71 at an upper T-conjunction 80 which completes a loop circuit including the gate valve 81, pressure release valve 83 (set at 45 psi) and a gate valve 84. The line 87 is connected at 85 to the water line 90 and has a gate valve 86 through which antifreeze solution may be introduced into the liquid supply if desired. The line 87 is connected at its other end into the conduit 45 for introducing the antifreeze solution to tank H. The antifreeze solution may also be distributed back to line 74 through its T-connection at 85. Line 74 extends into the tank L and includes in series the gate valve 75, a Watts back flow preventer valve 76 and pressure gauge 77. Pressure in this circuit is typically at about 30 psi.

Although water is indicated as a liquid media used in the system as is just described, any suitable liquid having desired specific heat, corrosion resistance properties, and the like may be utilized as a liquid media. In severe cold weather climates it may be necessary to include an antifreeze compound in solution if water is the chosen liquid media. Such antifreeze compounds are well known in the art, the most popularly used compound being liquid ethylene glycol.

The method of operation of the system just described is now summarized. At the start of a solar day, tank L contains liquid media at a non-useable low temperature. The solar pump 56 is energized to fill the collectors 40 with liquid from tank L. Tank H at this time is nearly empty or contains high energy liquid produced by solar energy during a previous solar day or by the use of the fossil fuel fired boiler 112 or both. The solar radiation heats the liquid in the array of collectors 40 to the desired higher temperature in a range necessary for operation of the heat operated device, such as at the heat exchanger 29. This temperature is sensed in the collector liquid and signals the controller 31 to again energize the solar pump 56 and open the control valve 61 in the circuit from the tank L to the collectors. The liquid is removed from tank L in the circuit and pumped into the collectors which in turn transfers the high energy liquid in the collectors into tank H. As the exit temperature of the liquid from the collectors is being sensed, when this exit temperature goes below the preselected high level temperature, this signals the controller 31 to stop the pump 56 and close control valve 61. At this time, the absorption unit 22 may be started since a supply of high temperature liquid is now in tank H and available for operating the machine at its constant most efficient temperature for best C.O.P. The conditions of liquid in tank H is sensed by elements 133-135 and establishes a condition in controller 31. The chilled water produced by the absorption refrigeration unit 22 will of course be stored in the tank 20, or may be directly utilized in the cooling circuit for building 10. In the operation just described, the collector is used as an integrater of the energy from the sun which is transferred without concern for a time schedule or flow rates to the high temperature tank H at a proper preselected temperature for best operation of the heat operated refrigeration machine. The liquid after it is used in the absorption machine 22 at the coils 29 is not returned to be mixed with the other solar heated liquid (tank H) thereby reducing or changing its temperature usefulness; but instead, the returning liquid is placed back into the tank L. The temperature drop through the coil 29 of the machine will typically reduce the liquid media from an input of about 220° F. to an output of about 180° F. The energy in the tank L is sufficient to heat the domestic hot water circulated through the coil 95 and thereby utilize residual solar heat in a second phase for the supply of domestic hot water. The operation just described may be termed as "batching" of the solar liquid through the collectors. If the solar flux level changes for any reason, such as by cloud cover, day or seasonal variation, or whatever, the same temperature level of output from the collectors to the system will be realized without serious control problems involved with variables in regulating the flow through the collectors.

The invention is most significant in a system which requires a relatively constant elevated temperature of liquid media for effective operation of a process, such as in sterilizing, pasturizing, absorption cooling or in food processing. The method of operation, just described, permits maintaining a relatively constant temperature for the process in which the invention is employed. Under the present invention utilizing the two tank system, the working liquid media may be conditioned through the collectors and placed in the high temperature tank (H) for controlled utilization to most effective heat energy needs in the heat engine requirement of the process. Heretofore systems of this type utilizing one tank storage have not been able to obtain and maintain such constant temperature control. The solar heated liquid constantly experiences a changing temperature in such prior systems, which is very difficult and impractical to regulate.

Figure 2:
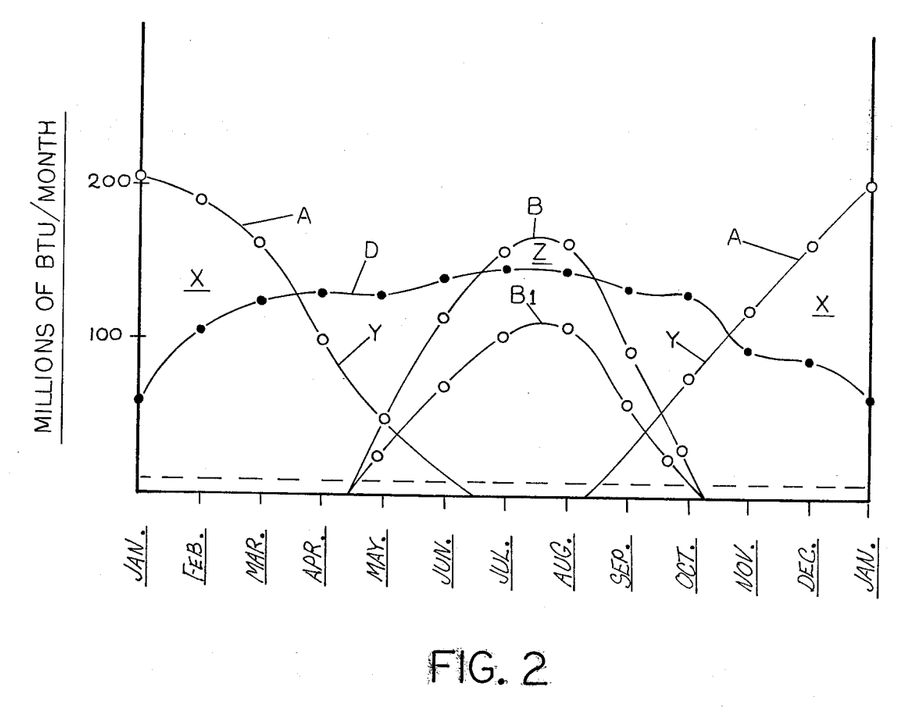
FIG. 2 is a graph illustrating by the curves thereon the energy requirement in BTU's for a load or installation in furnishing heating and cooling thereto over a year in relation to corresponding capacity of solar energy operated devices under the present invention and demonstrating an example of energy management to be achieved by the present invention.

With reference to FIG. 2 another significant feature in the invention will be described. The curve A on FIG. 2 represents an example of the energy requirements in BTU's throughout a year of the heating needed in a substantial building located in one of the New England states of the Northern Hemisphere. The curve B represents the energy requirements in BTU's during the year of the cooling needed in the building utilizing an absorption refrigeration unit operating at a C.O.P. of 0.7. Curve $B_1$ represents the actual cooling requirement for the building. The horizontal, dashed-line curve C represents the domestic hot water requirement for the installation. The solid line curve labeled D represents the solar energy capacity in BTU's for a selected array of solar collectors utilizing the system of this invention for servicing the heating/cooling requirements represented by the curves A-C, just described. This illustrates a practical utilization of solar energy collectors in such an installation. It should be noted that there is not sufficient capacity provided by solar energy in this system for satisfying 100% of the energy needed to heat and cool the building. If it is at least theoretically desirable to furnish such capacity totally from solar energy for the heating, cooling and domestic hot water, it should be readily apparent that in the months between March and June, and again between September and November, the solar collectors in total if all are operated will collect a vast excess of energy (BTU's) which must be disposed of or wasted; or, if on the other hand, the collectors are selectively shut down to only place in service those which are needed to fulfill the energy need at a given time, a sizeable equipment investment will be standing idle throughout a substantial portion of the year. It is therefore a practical expedient to select a solar energy capacity for the collectors to perform along the lines represented by the curve D on FIG. 2. Since the total energy integrated under the curve A as a heating requirement is more than the energy available under the curve D for some period of the operation of the solar collectors, the energy represented by the area above curve D and beneath curve A, indicated on FIG. 2, as X, will best be provided by auxiliary sources, such as a fossil fuel fired boiler 112 specified on FIG. 1. At or about mid-March, the capacity of the collectors and the demand for heat coincide, i.e., the curves cross, and thereafter until approximately May, the solar collectors produce excess energy. This excess of BTU's is represented by the area below curve D and bounded by the curves A and B, labeled Y on FIG. 2.

Looking at the cooling season for this building, there is a demand for cooling which begins about mid-June and ends around mid-August that exceeds the capacity of the solar collectors. This is the area labelled Z on FIG. 2 which is above curve D and below curve B. This added cooling capacity is best obtained through the auxiliary systems described in this invention, such as through the electrically powered reciprocating refrigerating unit 143 that supplies the extra chilled water to the storage tank 20.

Throughout the year, the domestic hot water needs are met through the auxiliary circuit described earlier herein.

The energy requirements of a given installation, such as the example given by FIG. 2, may be placed in memory of the programmable controller of the type herein described. As conditions change within a period of the energy requirements, this too may be updated from time to time and placed in the programmer's memory. This data on energy requirement may be instantaneously reviewed and updated by the program logic to maintain a cost effective useage of the energy available at current values, cost, etc; that is to say the utilization of a source of energy as solar, fossil fuel or electric utility at any given time and circumstance will be managed by the programmed controller based upon the memory in the matrix of data therein in the manner readily understood by those skilled in the art of such programmable control unit.

In the present invention, a significant feature is included by the ability to isolate one or more of the collector groups, such as by removal of one or more of the plural collector arrays in the system from usage. This may be done by closing the valves 43 and 44 (FIG. 1) adjacent to the collector array 40 which is to be rendered inactive in the system, thereby reducing the B.T.U. capacity to match or nearly match a current energy need.

On FIG. 2, the contour of the curve D is representative of the integral of the several arrays of solar collectors in the system designed for the building load; however, individual arrays of the collectors will have a curve for each array that will parallel this curve D and comprise an increment of the area thereunder. It is therefore possible to manage the solar energy needs in periods where excess BTU's would be produced by the designed system's full capacity—for example see the area labelled as Y on FIG. 2—by closing down some of the collectors in the system, thereby reducing the BTU output for the particular time period to match the requirement of the building. Such regulation of the solar collector arrays in the system may well be placed under the management of the programmable controller, or this may be handled by a manual adjustment of the inlet/outlet valves of the collector arrays 40 illustrated on FIG. 1.

What is claimed is:

1. A solar energy operated system comprising
   a solar energy collector apparatus including inlet and outlet thereto,
   a fluid media for absorbing solar energy as heat in the collector apparatus,
   a first storage tank for high temperature fluid media,
   a heat utilization device operable by heat obtained from high temperature fluid media at a predetermined operating temperature,
   a separate second storage tank for low temperature fluid media separated from said first tank,
   a first fluid media circuit for flow of high temperature fluid media from the output of said collector apparatus to said first tank,
   a second fluid media circuit for flow of high temperature fluid media from said first tank through the heat utilization device and to said second tank,
   a third fluid media circuit from said second tank to the inlet of said collector apparatus and connected to the first fluid media circuit through said collector apparatus, and
   a pump means in the system operable to circulate high temperature fluid media at said predetermined operating temperature from said first tank to the heat utilization device for operating the latter, and from the heat utilization device at reduced temperature to said second tank, said pump means also being operable for moving low temperature fluid media from said second tank to the inlet of the collector apparatus and displacing high temperature fluid media in said collector apparatus into said first circuit for flow to said first tank.

2. A system as set forth in claim 1 wherein the pump means comprises a pump interposed in said second fluid media circuit.

3. The system as set forth in claim 2 wherein the pump means also includes a pump in the third fluid media circuit for pumping low temperature fluid media to the collecting apparatus and displacing high temperature fluid media therein for flow of said fluid media at said operating temperature in the first fluid media circuit to said first tank.

4. A system as set forth in claim 1 in which the predetermined operating temperature of fluid media is in the range of 190°–250° F.

5. A system as set forth in claim 4 in which the heat utilization device comprises an absorption refrigeration machine.

6. A solar energy operated system comprising
   a first walled storage vessel for high temperature liquid,
   a separate second walled storage vessel for low temperature liquid,
   a solar energy collecting apparatus mounted in a position for exposure to solar radiation and including inlet means and outlet means for receiving a liquid media and circulating it therethrough to the outlet means for exchanging heat energy therewith from said collecting apparatus,
   first fluid conduit means connected between said energy collecting apparatus and said first storage vessel,
   a heat operated device including a heat exchanger,
   a second conduit means connected between said first storage vessel and said heat exchanger,
   a third conduit means connected between said heat exchanger and said second storage vessel, and a fourth conduit means connected between said second storage vessel and said inlet means of said solar energy collecting apparatus, means in said fourth conduit means for controlling flow of liquid to said inlet means of said collecting apparatus, control means including a sensor element in said collecting apparatus sensing temperature of the liquid therein adjacent the outlet means thereof, said control means being operatively connected to the flow regulating means, and pump means for pumping liquid inducing flow through said first and fourth conduit means of the system and operatively connected to said control means, said control means operating said flow regulating means and said pump means for liquid flow in said first and fourth conduit means in response to a sensed preselected elevated temperature of liquid in said collecting apparatus.

7. The system as set forth in claim 6 in which said pump means comprises a liquid pump in the fourth conduit means.

8. The system as set forth in claim 7 which includes a liquid pump in said second conduit means operable for inducing flow of liquid through said heat exchanger.

9. A system as set forth in claim 8 in which said heat operated device comprises a space heating apparatus connected to heat an enclosure, a means in said second conduit means for regulating flow of liquid therein to the heat exchanger of the space heating apparatus, a temperature responsive control means connected with said enclosure and operatively connected for regulating the operation of said pump and said flow regulating means in said second conduit means for inducing flow of liquid to said heat exchanger in response to temperature within the enclosure.

10. A system as set forth in claim 8 in which said heat operated device comprises an absorption refrigeration apparatus, a means in said second conduit means for regulating flow of liquid therein to the heat exchanger of the absorption refrigeration apparatus, a control means operatively connected for regulating the operation of said pump and said flow regulating means in said second conduit means for inducing flow of liquid to said heat exchanger of said refrigeration apparatus.

11. A solar energy system comprising
a solar energy collector having an inlet and outlet thereto for a liquid media to be heated therein by absorbed heat energy of solar radiation,
a high temperature liquid storage tank,
a low temperature liquid storage tank,
a supply of liquid media, said media being capable of absorbing heat and transmitting thermal energy thereby,
a liquid circuit including means to regulate the flow of liquid therethrough,
a heat operated apparatus including a heat exchanger,
said liquid circuit including a first flow connection from the output of the collector to said high temperature liquid tank, a second flow connection from said high temperature liquid tank to the heat exchanger of said apparatus, a third flow connection from the heat exchanger of said apparatus to the low temperature liquid tank, and a fourth flow connection from the low temperature liquid tank to the input of said collector, a pump means to induce flow of liquid in said circuit causing flow of liquid (1) from the low temperature liquid tank to said collector, (2) from said collector to the high temperature liquid tank and (3) from the high temperature liquid tank to the heat exchanger of said apparatus and to the low temperature liquid tank therefrom, and a controller connected to said collector for sensing the temperature of liquid therein, said controller being connected to operate said flow control means and pump means for regulation of the flow of liquid in response to a predetermined high temperature of liquid in said collector.

12. The system as set forth in claim 11 wherein the predetermined high temperature of the liquid is in the range of 190°–250° C.

13. The system set forth in claim 11 in which the heat operated machine comprises an absorption refrigeration machine.

14. The system set forth in claim 11 wherein the pump means induces flow of liquid from the low temperature liquid tank to said collector and from said collector to the high temperature liquid tank in response to the controller sensing a temperature of liquid adjacent the outlet of said collector that is at least at the predetermined high temperature, and separate pump means to induce flow of liquid from the high temperature liquid tank to the heat exchanger of said apparatus upon demand by said apparatus and to said low temperature tank in response to the controller sensing a temperature of liquid in said high temperature tank at the predetermined high temperature for operating said heat operated apparatus.

15. In a solar energy operated system including a liquid media, a heat utilizing device operated by heat exchange with liquid media heated at least to preselected elevated temperature and supplied thereto, and solar heating apparatus for heating said liquid media, a method for operating said device by solar energy heated liquid media at said elevated temperature comprising the steps of:

heating liquid media to said elevated temperature in the solar heating apparatus,
transferring said heated liquid media at said elevated temperature to a first high temperature tank H,
transferring liquid media at said elevated temperature from said tank H to the heat utilizing device for operating the latter by heat exchange with said liquid media thereby lowering the temperature of said liquid media below said elevated temperature,
placing the lower temperature liquid media after it is utilized by said device in a second low temperature tank L separate from said tank H, and
transferring liquid media from said second tank L to the solar heating apparatus.

16. The method of claim 15 which includes the step of moving liquid media at said lower temperature from said tank L to the solar heating apparatus for reheating said liquid thereby.

17. The method of claim 15 which includes sensing the temperature of the liquid media in the solar heating apparatus and regulating the transfer to said tank H in response to a sensed predetermined elevated temperature of the liquid in said heating apparatus.

18. The method of claim 17 which includes initiating movement of lower temperature liquid media from said tank L to the solar heating apparatus in response to sensing high temperature liquid media in said solar heating apparatus.

19. The method of claim 15 in which the heat utilizing device comprises an absorption refrigeration machine operated with liquid media at a preselected elevated temperature in the range 190°–250° F.

20. A solar energy operated system comprising
a solar energy collector apparatus including fluid media inlet and outlet means for flow of media through said apparatus,
a fluid media for absorbing solar energy as heat while in the collector apparatus,
a first high temperature tank H for said fluid media,
a second low temperature tank L for said fluid media,
a heat utilization device including a heat exchanger operable by heat exchanged from high temperature fluid media circulated through said heat exchanger,
fluid media circuit for flow thereof through the solar energy collector apparatus, said tank H, said heat exchanger of said heat utilization device, said tank L and said collector apparatus, and
pump means in said fluid media circuit to circulate fluid media from said tank H at a predetermined operating temperature to the heat utilization device for operating the latter, to said tank L from said device and to said solar energy collector apparatus from said tank L for heating fluid media to elevated temperature at least equal to said predetermined operating temperature, said media at elevated temperature being moved in the circuit to said tank H.

* * * * *